United States Patent Office 2,839,483
Patented June 17, 1958

2,839,483

INCREASING THE PARTICLE SIZE OF SYNTHETIC RUBBER LATICES BY UTILIZING VOLATILE BASE SALTS

Louis H. Howland, Watertown, and Alfred Nisonoff, Waterbury, Conn., assignors to United States Rubber Company, New York, N. Y., a corporation of New Jersey No Drawing. Application June 30, 1954
Serial No. 440,561

12 Claims. (Cl. 260—23.7)

This invention relates to increasing the particle size of synthetic rubber latices, particularly in the manufacture of low viscosity, high solids latices.

Synthetic rubber latices are commonly prepared commercially by emulsion polymerization of the rubber-forming monomers, e. g., butadiene and styrene, in the presence of 3 to 10 parts of alkali-metal soap per 100 parts of polymerizable monomers. The solids concentration of the latices is generally less than 40% and where the latex is to be used directly, as in the manufacture of sponge rubber, the latex concentration is increased by evaporation of water. Due to the small particle size of some latices, their viscosity is very high when concentrated to 50% solids concentration, or over.

According to the present invention, large particle size latices are produced that give lower viscosities at a given solids concentration, and permit concentrating the latices to higher solids content.

In carrying out the present invention, the first step is to prepare an alkaline latex containing 3 to 10 parts per 100 parts of rubber of the latex of alkali-metal soap of soap-forming monocarboxylic acid having 10 to 20 carbon atoms per molecule, and a volatile base salt of an acid, other than such a soap-forming acid, which has an ionization constant greater than $1 \times 10^{-5}$ and is stronger than said soap-forming acid and which is more soluble in water than said soap-forming acid and which is not volatilized from aqueous solution on distillation of the volatile base from an aqueous solution of the volatile base salt, such volatile base salt being in amount to react with $2/10$ to $7/10$ of the soap on removal of the volatile base. In other words, the acid equivalent of the volatile base salt is $2/10$ to $7/10$ that of the alkali-metal soap. The volatile base salt is preferably added to the latex as an alkaline aqueous solution to prevent local coagulation in the latex. The soap is generally used as an emulsifying and dispersing agent in the latex preparation, and the volatile base salt may be included in the polymerization recipe or added during or subsequent to the polymerization. The addition of the salt alone, as is well known, causes some increase in the particle size of the latex. As a second step, the volatile base is removed by distilling the same from the latex thereby freeing the acid from the volatile base salt which reacts with only part ($2/10$ to $7/10$) of the alkali-metal soap to produce free soap-forming acid and reduce the pH of the latex without coagulation, since only part of the soap stabilizer is destroyed. The latex of lowered pH is then heated at 40° C. to 100° C. to further increase the particle size of the latex. The amount of heating at 40° C. to 100° C. may be measured by different criteria. Heating for one hour or longer will give the required increase in particle size. If the heating is part of a concentrating operation, it may be continued until the solids concentration of the latex is increased 5% or more. When optical density measurements are made, the heating may be continued until the optical density per gram of rubber per liter is increased at least 25%. The latex may contain an acid-stable dispersing agent in addition to the soap stabilizer, in which case the heating at the lowered pH after removal of the volatile base will still increase the particle size of the latex. The increase in particle size or agglomeration of the latex particles by the incorporation of the volatile-base salt or by the reduction in pH by distillation of the volatile base is only slight compared to the increase in particle size on heating of the latex after reduction of the pH. Where the added salt is a volatile base salt of an acid that is also volatilized on distillation of the volatile base from an aqueous solution of the salt, there is no appreciable reduction in pH on volatilization of the salt and the increase in particle size on heating to remove the volatile base salt of the volatile acid is again only slight compared to the heating of the latex after reduction of the pH as in the present invention.

After the desired amount of agglomeration or increase in particle size at the elevated temperature has occurred, alkali is added to the latex to increase the pH and stop the process of agglomeration. The added alkali which may be alkali-metal hydroxide, or ammonia or an amine, should be in amount to raise the pH of the latex at least one unit and assure that the pH of the latex is above 9, i. e., if after increase of the pH one unit it is not above 9, sufficient alkali is added to raise it above 9. The latex after the final alkali addition to a pH above 9 may be used as such or concentrated to a higher solids content. If the latex is to be concentrated, it is preferable to heat concentrate the latex after reduction in the pH whereupon the heating to increase the particle size is part of the concentrating operation as above suggested. The removal of the volatile base from the volatile base salt by distillation, rather than by reaction with formaldehyde, as in the case of ammonia, possesses the following advantages in addition to the elimination of a difficult and time-consuming step. First, where the volatile base salt is part of the polymerization recipe, there is no dilution of the latex as with the addition of formaldehyde that must be made to the finished latex, with consequent necessity for removal of the added water on concentrating. There is also no production of hexamethylenetetramine which is a skin irritant. Further, the present method of removing the volatile base by distillation permits the use of those volatile amine salts which do not react with formaldehyde, as well as ammonium salts.

The soap used may be an alkali-metal (sodium or potassium) soap of soap-forming monocarboxylic acids having 10 to 20 carbon atoms per molecule. Such soap-forming acid may be one or a mixture of members of the saturated fatty acid series ($C_nH_{2n}O_2$), or of the unsaturated fatty acid series ($C_nH_{2n-2}O_2$) or ($C_nH_{2n-4}O_2$), or of a rosin acid, including abietic acid, hydrogenated abietic acid, dehydrogenated abietic acid, disproportionated abietic acid or polymerized abietic acid. Examples of such soap-forming acids of the fatty acid series are capric, undecenoic, lauric, myristic, palmitic, margaric, stearic, oleic, linoleic and arachidic acids.

The volatile basis that may be used in forming the volatile base salts are ammonia and amines that are removed from aqueous solution by distilling at temperatures of 100° C., or below, as by distilling at atmospheric pressure or under vacuum or by steam distillation. Examples of such volatile bases are methylamine, ethylamine, dimethylamine, diethylamine, triethylamine, propylamine, dipropylamine, isopropylamine, di-isopropylamine, monobutylamine, monoamylamine, monohexylamine, cyclohexylamine, piperidine, 1-methyl-piperidine, 2-pipecoline, 3-pipecoline, 4-pipecoline, morpholine, and such mixed amines as methyl ethylamine, methyl propylamine, methyl butylamine, and methyl diethylamine.

The acids having an ionization constant greater than $1 \times 10^{-5}$ that are stronger than said soap-forming acids and that may be used in forming the volatile base salts and which on distillation of the volatile base will free soap-forming acid and reduce the pH of the latex are exemplified by the following: adipic, benzoic, bromic, α-bromopropionic, β-bromopropionic, butyric, α-chloropropionic, β-chloropropionic, chloracetic, chloric, citric, dichloroacetic, fumaric, hippuric, hydrobromic, hydrochloric, hydroiodic, iodic, isobutyric, isovaleric, lactic, malic, maleic, mandelic, α-naphthoic, β-naphthoic, nicotinic, nitric, oxalic, phosphoric, phosphorous, phthalic, propionic, pyrophosphoric, pyrotartaric, salicylic, succinic, sulfanilic, sulfuric, tartaric, trichloroacetic, and valeric acids.

The polymerizable material in the preparation of the synthetic rubber latex may be one or a mixture of butadienes-1,3, for example, butadiene-1,3, isoprene, chloroprene, cyano-butadiene-1,3, 2-phenyl butadiene-1,3, piperylene, 2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefines containing a terminal methylene ($CH_2=C<$) group and are copolymerizable with butadienes-1,3, are aryl olefines, such as styrene, vinyl naphthylene; alpha-methyl styrene, para chlorostyrene, dichlorostyrene, alpha-methyl dichlorostyrene; the alpha-methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidine chloride; alpha, beta and gamma vinyl pyridines, 5-ethyl-2-vinyl pyridine, 2-methyl-5-vinyl pyridine, vinyl carbazole. Such a synthetic rubber latex may generically be termed a "butadiene polymer synthetic rubber latex."

The following examples illustrate the invention. All parts and percentages referred to herein are by weight.

*Example I*

A latex was prepared by polymerizing at 5° C. the following recipe: 50 parts of butadiene-1,3, 50 parts of styrene, 140 parts of water, 0.04 part of sodium hydroxide, 0.02 part of ethylenediamine tetraacetic acid, 5.0 parts of potassium soap of disproportionated abietic acid, 0.8 part of potassium chloride, 0.3 part of tertiary ($C_{12}$, $C_{14}$ and $C_{16}$) mercaptan, 0.1 part of diisopropylbenzene hydroperoxide, 0.005 part of ferrous sulfate and 0.1 part of sodium formaldehyde sulfoxylate. After 85% conversion of monomers to polymer, the reaction was shortstopped by the addition of 0.2 part of sodium dimethyl dithiocarbamate. The latex was steam distilled to remove unconverted monomers. The latex was then concentrated by heating under vacuum until the solids content was 49.8% by weight. This will be termed the original latex, and the pH was 10.3.

To a portion of the thus treated latex containing 100 parts of synthetic rubber was added 10 parts of water, a solution of 0.45 parts of ammonium chloride and 0.14 part of ammonia ($NH_3$) in 14 parts of water, the mixture having a pH of 9.5, and 4 parts of a 10% aqueous solution of potassium oleate. The pH of the thus treated latex was 10.2. The mixture was concentrated for three hours in a laboratory size disc concentrator at a temperature of 65° C. which removed the ammonia. The thus treated latex was heated at 85° C. for two hours. The pH was found to be 9.2 and it was then increased to 11.2 by the addition of a 2% solution of sodium hydroxide. The latex at this stage was at 50.8% solids. The latex was then returned to the disc concentrator and was concentrated to 59.8% solids. Viscosities and optical densities were run on the original latex at 49.8% solids and on the latex after treatment by the process of the present invention at 50.8% solids and on concentrating to 59.8% solids. As is known, the optical density is the logarithm of the intensity of light through water divided by the intensity of light through the latex being tested. Optical densities in this and the other examples were determined in a Beckman spectrophotometer, type DU, using a wave length of 7000 Angstrom units. In practice, the latex is diluted to where the optical density is somewhere between 0.05 and 0.15, and from the determined actual optical density and the known concentration, one calculates the optical density/gram of rubber/liter of water. The optical density/gram of rubber/liter of water determinations give a comparison of the average particle size of the latex. For latices containing the same type of polymer, the greater the value, the larger the average particle size of the latex.

The viscosity of the original latex at 49.8% solids was 1360 centipoises, whereas the viscosity of the treated latex at 50.8% solids was only 8 centipoises and at 59.8% solids (approximately 10% higher solids than the original latex) was only 760 centipoises, still lower than the original latex. The optical density/gram of rubber/liter of water was 0.35 in the case of the original latex and was 1.62 in the case of the latex of 59.8% solids treated according to the present invention (which was substantially the same as the treated latex at 50.8% solids since agglomeration had been stopped at 50.8% solids by raising the pH to 11.2.

*Example II*

A latex was prepared by polymerizing at 5° C. the following recipe: 60 parts of butadiene-1,3, 40 parts of styrene, 150 parts of water, 0.07 part of sodium hydroxide, 0.08 part ethylenediamine tetraacetic acid, 3.5 parts of potassium soap of disproportionated abietic acid, 0.4 part of potassium chloride, 0.08 part of the tertiary ($C_{12}$, $C_{14}$ and $C_{16}$) mercaptan, 0.1 part of the condensation product of formaldehyde and sodium naphthalene sulfonate, 0.1 part of diisopropylbenzene hydroperoxide, 0.004 part of ferrous sulfate, 0.1 part of sodium formaldehyde sulfoxylate. After 85% conversion, 0.15 part of sodium dimethyldithiocarbamate was added as a shortstop. One part of potassium oleate as a 15% aqueous solution was added as an additional stabilizer. The latex was steam distilled to remove unconverted monomers. The pH of the latex was found to be 9.4.

One portion of the above latex was heat concentrated until it was viscous. It was then heated for two hours at 90° C. This control latex had a solids concentration of 46.9%. To the other portion of the above latex was added (per 100 parts of synthetic rubber) a solution having a pH of 9 of 0.6 part of ammonium chloride and 0.19 part of ammonia ($NH_3$) in 50 parts of water, and 3 parts of a 10% aqueous solution of potassium oleate. The pH then was 9.6. The latex was concentrated at 45°–60° C. until there was a noticeable increase in viscosity. At this point the solids content was 54.7%, and the pH was 7.6. The pH of the latex was raised to 9.5 by the addition of sodium hydroxide solution and the latex was concentrated again to a solids content of 54.0%.

The viscosity of the control latex at 46.9% was 850 centipoises, whereas the viscosity of the latex treated according to the present invention at 54.0% solids was 360 centipoises. The optical density/gram of rubber/liter of water was 0.19 in the case of the control latex and was 0.60 in the case of the 54.0% solids latex treated according to the present invention.

*Example III*

A latex was prepared by polymerizing at 5° C. the following recipe: 70 parts of butadiene-1,3, 30 parts of styrene, 140 parts of water, 0.01 part of ethylene diamine tetraacetic acid, 3.0 parts of potassium soap of disproportionated abietic acid, 0.25 part of the sodium salt of the condensation product of formaldehyde and naphthalene sulfonic acid, 1.0 part of potassium sulfate, 0.2 part of diisopropylbenzene hydroperoxide, 0.005 part of ferrous sulfate, 0.2 part of sodium formaldehyde sulfoxylate. After 80% conversion, 0.2 part of sodium dimethyl dithiocarbamate was added as a shortstop. One part of potassium oleate as a 15% aqueous solution was added as additional stabilizer.

One portion of the latex was steam distilled to remove unconverted monomers. The pH was 9.4. This control portion was concentrated to 55.5% solids. To another portion of the latex before steam distilling was added (per 100 parts of charged monomers) a solution having a pH of 9.5, of 0.4 part of ammonium chloride and 0.13 part of ammonia ($NH_3$) in 15 parts of water, and 3 parts of a 10% aqueous solution of potassium oleate. The latex was then steam distilled to remove ammonia as well as the unconverted monomers. The pH after steam distillation was 7.2. The latex was concentrated at a temperature of 45–55° C. in a disc concentrator to raise the solids concentration from 15% to 59%, after which 5% aqueous potassium hydroxide was added to raise the pH to 9.5. The solids concentration was 57.1%.

The viscosity of the control at 55.5% solids was 8800 centipoises whereas the viscosity of the latex treated according to the present invention at 57.1% solids was 150 centipoises. The optical density/gram of rubber/liter of water was 0.20 in the case of the control latex and 2.56 in the case of the latex treated according to the present invention.

*Example IV*

The latex used was the latex of Example II. The control was the same as in Example II. In treating the second portion according to the present invention, there was added to the latex portion before steam distillation (per 100 parts of synthetic rubber) a solution of 0.91 part of dimethyl ammonium chloride and 0.5 part of dimethylamine in 27 parts of water, the mixture having a pH of 9.5, and 2.2 parts of a 15% aqueous solution of potassium oleate. The pH was 9.8. The latex was steam distilled for 45 minutes to remove dimethylamine and the unconverted monomers, thus lowering the pH to 7.3. The latex was then concentrated at a temperature of 40–50° C. until fairly viscous, and was then heated for one hour at 90° C. The pH of the latex was then raised to 9.5 with 2% sodium hydroxide, and the latex was reconcentrated to 49.7% solids.

The viscosity of the control latex at 46.9% was 850 centipoises, as in Example II, whereas the viscosity of the latex treated according to the present invention at 49.7% solids was 90 centipoises. The optical density/gram of rubber/liter of water was 0.19 in the case of the control as in Example II, and was 0.38 in the case of the 49.7% solids latex treated according to the present invention.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method which comprises preparing an alkaline synthetic rubber latex aqueous emulsion polymerizate of material selected from the group consisting of butadienes-1,3 and mixtures of butadienes-1,3 with compounds which contain a single $CH_2=C<$ group and are copolymerizable with butadienes-1,3 having a pH above 9, and containing 3 to 10 parts per 100 parts of rubber of the latex of alkali-metal soap of soap-forming monocarboxylic acid having 10 to 20 carbon atoms per molecule, and containing a volatile base salt which is a salt of a volatile base selected from the group consisting of ammonia and amines that are removable from aqueous solution by distillation and of an acid which has an ionization constant greater than $1 \times 10^{-5}$ and which is stronger than said soap-forming acid and which is more soluble in water than said soap-forming acid and which is not volatilized from aqueous solution on distillation of the volatile base from an aqueous solution of the volatile base salt, said volatile base salt being present in amount to react with $2/10$ to $7/10$ of said alkali-metal soap on removal of the volatile base, distilling the volatile base of said volatile base salt from the latex, whereby enough acid of the volatile base salt is liberated to react with said $2/10$ to $7/10$ of the soap present to form the alkali-metal salt of said acid and free soap-forming monocarboxylic acid and reduces the pH of the latex without coagulating the latex, heating the thus treated latex for at least one hour at a temperature from 40° C. to 100° C. to increase the particle size of the latex and thereafter adding alkali to the latex to raise the pH of the latex at least one unit and to assure a pH above 9 to increase the stability of the same.

2. The method which comprises preparing an alkaline synthetic rubber latex aqueous emulsion polymerizate of material selected from the group consisting of butadienes-1,3 and mixtures of butadienes-1,3 with compounds which contain a single $CH_2=<$ group and are copolymerizable with butadienes-1,3 having a pH above 9 and containing 3 to 10 parts per 100 parts of rubber of the latex of alkali-metal soap of soap-forming monocarboxylic acid having 10 to 20 carbon atoms per molecule, and containing a volatile base salt which is a salt of a volatile base selected from the group consisting of ammonia and amines that are removable from aqueous solution by distillation and of an acid which has an ionization constant greater than $1 \times 10^{-5}$ and which is stronger than said soap-forming acid and which is more soluble in water than said soap-forming acid and which is not volatilized from aqueous solution on distillation of the volatile base from an aqueous solution of the volatile base salt, said volatile base salt being present in amount to react with $2/10$ to $7/10$ of said alkali-metal soap on removal of the volatile base, distilling the volatile base of said volatile base salt from the latex, whereby enough acid of the volatile base salt is liberated to react with said $2/10$ to $7/10$ of the soap present to form the alkali-metal salt of said acid and free soap-forming monocarboxylic acid and reduces the pH of the latex without coagulating the latex, heat concentrating the latex at a temperature from 40° C. to 100° C. until the solids concentration of the latex has increased at least 5% whereby the particle size of the latex is increased, and thereafter adding alkali to the latex to raise the pH of the latex at least one unit and to assure a pH above 9 to increase the stability of the same.

3. The method which comprises preparing an alkaline synthetic rubber latex aqueous emulsion polymerizate of material selected from the group consisting of butadienes-1,3 and mixtures of butadienes-1,3 with compounds which contain a single $CH_2=<$ group are copolymerizable with butadienes-1,3 having a pH above 9 and containing 3 to 10 parts per 100 parts of rubber of the latex of alkali-metal soap of soap-forming monocarboxylic acid having 10 to 20 carbon atoms per molecule, and containing a volatile base salt which is a salt of a volatile base selected from the group consisting of ammonia and amines that are removable from aqueous solution by distillation and of an acid which has an ionization constant greater than $1 \times 10^{-5}$ and which is stronger than said soap-forming acid and which is more soluble in water than said soap-forming acid and which is not volatilized from aqueous solution on distillation of the volatile base from an aqueous solution of the volatile base salt, said volatile base salt being present in amount to react with $2/10$ to $7/10$ of said alkali-metal soap on removal of the volatile base, distilling the volatile base of said volatile base salt from the latex, whereby enough acid of the volatile base salt is liberated to react with said 2/10 to 7/10 of the soap present to form the alkali-metal salt of said acid and free soap-forming monocarboxylic acid and reduces the pH of the latex without coagulating the latex, heating the thus treated latex at 40° C. to 100° C. until the optical density per gram of rubber per liter of water is increased at least 25% as measured in a spectrophotometer using a wave length of 7000 Angstrom units, and thereafter adding alkali to the latex to raise the pH of the latex at least one unit and to assure a pH above 9 to increase the stability of the same and heat concentrating the latex.

4. The method which comprises preparing an alkaline synthetic rubber latex emulsion polymerizate of a mixture of butadiene-1,3 and styrene containing at least 50% by weight of the butadiene-1,3 having a pH above 9 and containing 3 to 10 parts per 100 parts of rubber of the latex of alkali-metal soap of soap-forming monocarboxylic acid having 10 to 20 carbon atoms per molecule, and containing a volatile base salt which is a salt of a volatile base selected from the group consisting of ammonia and amines that are removable from aqueous solution by distillation and of an acid which has an ionization constant greater than $1 \times 10^{-5}$ and which is stronger than said soap-forming acid and which is more soluble in water than said soap-forming acid and which is not volatilized from aqueous solution on distillation of the volatile base from an aqueous solution of the volatile base salt, said volatile base salt being present in amount to react with 2/10 to 7/10 of said alkali-metal soap on removal of the volatile base, distilling the volatile base of said volatile base salt from the latex, whereby enough acid of the volatile base salt is liberated to react with said 2/10 to 7/10 of the soap present to form the alkali-metal salt of said acid and free soap-forming monocarboxylic acid and reduces the pH of the latex without coagulating the latex, heating the thus treated latex for at least one hour at a temperature from 40° C. to 100° C. to increase the particle size of the latex and thereafter adding alkali to the latex to raise the pH of the latex at least one unit and to assure a pH above 9 to increase the stability of the same and heat concentrating the latex.

5. The method which comprises preparing an alkaline synthetic rubber latex emulsion polymerizate of a mixture of butadiene-1,3 and styrene containing at least 50% by weight of the butadiene-1,3 and having a pH above 9 and containing 3 to 10 parts per 100 parts of rubber of the latex of alkali-metal soap of soap-forming monocarboxylic acid having 10 to 20 carbon atoms per molecule and containing a volatile base salt which is a salt of a volatile base selected from the group consisting of ammonia and amines that are removable from aqueous solution by distillation and of an acid which has an ionization constant greater than $1 \times 10^{-5}$ and which is stronger than said soap-forming acid and which is more soluble in water than said soap-forming acid and which is not volatilized from aqueous solution on distillation of the volatile base from an aqueous solution of the volatile base salt, said volatile base salt being present in amount to react with 2/10 to 7/10 of said alkali-metal soap on removal of the volatile base, distilling the volatile base of said volatile base salt from the latex whereby enough acid of said volatile base salt is liberated to react with said 2/10 to 7/10 of the soap present to form the alkali-metal salt of said acid and free soap-forming monocarboxylic acid and reduces the pH of the latex without coagulating the latex, heat concentrating the latex at a temperature from 40° C. to 100° C. until the solids concentration of the latex has increased at least 5% whereby the particle size of the latex is increased, and thereafter adding alkali to the latex to raise the pH of the latex at least one unit and to assure a pH above 9 to increase the stability of the same.

6. The method which comprises preparing an alkaline synthetic rubber latex emulsion polymerizate of a mixture of butadiene-1,3 and styrene containing at least 50% by weight of the butadiene-1,3 and having a pH above 9 and containing 3 to 10 parts per 100 parts of rubber of the latex of alkali-metal soap of soap-forming monocarboxylic acid having 10 to 20 carbon atoms per molecule, and containing a volatile base salt which is a salt of a volatile base selected from the group consisting of ammonia and amines that are removable from aqueous solution by distillation and of an acid which has an ionization constant greater than $1 \times 10^{-5}$ and which is stronger than said soap-forming acid and which is more soluble in water than said soap-forming acid and which is not volatilized from aqueous solution on distillation of the volatile base from an aqueous soltuion of the volatile base salt, said volatile base salt being present in amount to react with 2/10 to 7/10 of said alkali-metal soap on removal of the volatile base, distilling the volatile base of said volatile base salt from the latex whereby enough acid of said volatile base salt is liberated to react with said 2/10 to 7/10 of the soap present to form the alkali-metal salt of said acid and free soap-forming monocarboxylic acid and reduces the pH of the latex without coagulating the latex, heating the thus treated latex at 40° C. to 100° C. until the optical density per gram of rubber per liter of water is increased at least 25% as measured in a spectrophotometer using a wave length of 7000 Angstrom units, and thereafter adding alkali to the latex to raise the pH of the latex at least one unit and to assure a pH above 9 to increase the stability of the same.

7. The method which comprises preparing an alkaline synthetic rubber latex aqueous emulsion polymerizate of material selected from the group consisting of butadienes-1,3 and mixtures of butadienes-1,3 with compounds which contain a single $CH_2=C<$ group and are copolymerizable with butadienes-1,3 having a pH above 9, and containing 3 to 10 parts per 100 parts of rubber of the latex of alkali-metal soap of soap-forming monocarboxylic acid having 10 to 20 carbon atoms per molecule and containing a volatile base chloride which is a salt of a volatile base selected from the group consisting of ammonia and amines that are removable from aqueous solution by distillation and of hydrochloric acid in amount to react with 2/10 to 7/10 of said alkali-metal soap on removal of the volatile base, distilling the volatile base of said volatile base chloride from the latex, whereby enough hydrochloric acid is liberated to react with said 2/10 to 7/10 of the soap present to form alkali-metal chloride and free soap-forming monocarboxylic acid and reduces the pH of the latex without coagulating the latex, heating the thus treated latex for at least one hour at a temperature from 40° C. to 100° C. to increase the particle size of the latex and thereafter adding alkali to the latex to raise the pH of the latex at least one unit and to assure a pH above 9 to increase the stability of the same.

8. The method which comprises preparing an alkaline synthetic rubber latex aqueous emulsion polymerizate of material selected from the group consisting of butadienes-1,3 and mixtures of butadienes-1,3 with compounds which contain a single $CH_2=C<$ group and are copolymerizable with butadienes-1,3 having a pH above 9 and containing 3 to 10 parts per 100 parts of rubber of the latex of alkali-metal soap of soap-forming monocarboxylic acid having 10 to 20 carbon atoms per molecule, and containing a volatile base chloride which is a salt of a volatile base selected from the group consisting of ammonia and amines that are removable from aqueous solution by distillation and of hydrochloric acid in amount to react with 2/10 to 7/10 of said alkali-metal soap on removal of the volatile base, distilling the volatile base of said volatile base chloride from the latex, whereby enough hydrochloric acid is liberated to react with said 2/10 to 7/10 of the soap present to form alkali-metal chloride and free soap-forming monocarboxylic acid and reduces the pH of the latex without coagulating the latex, heat concentrating the latex at a temperature from 40° C. to 100° C. until the solids concentration of the latex has increased at least 5% whereby the particle size of the latex is increased, and thereafter adding alkali to the latex to raise the pH of the latex at least one unit and to assure a pH above 9 to increase the stability of the same.

9. The method which comprises preparing an alkaline synthetic rubber latex aqueous emulsion polymerizate of material selected from the group consisting of butadienes-1,3 and mixtures of butadienes-1,3 with compounds which contain a single $CH_2=C<$ group and are copolymerizable with butadienes-1,3 having a pH above 9 and containing 3 to 10 parts per 100 parts of rubber of the latex of alkali-metal soap of soap-forming monocarboxylic acid and containing a volatile base chloride which is a salt of a volatile base selected from the group consisting of ammonia and amines that are removable from aqueous solution by distillation and of hydrochloric acid in amount to react with $2/10$ to $7/10$ of said alkali-metal soap on removal of the volatile base, distilling the volatile base of said volatile base chloride from the latex, whereby enough hydrochloric acid is liberated to react with said $2/10$ to $7/10$ of the soap present to form alkali-metal chloride and free soap-forming monocarboxylic acid and reduces the pH of the latex without coagulating the latex, heating the thus treated latex at 40° C. to 100° C. until the optical density per gram of rubber per liter of water is increased at least 25% as measured in a spectrophotometer using a wave length of 7000 Angstrom units, and thereafter adding alkali to the latex to raise the pH of the latex at least one unit and to assure a pH above 9 to increase the stability of the same.

10. The method which comprises preparing an alkaline synthetic rubber latex emulsion polymerizate of a mixture of butadiene-1,3 and styrene containing at least 50% by weight of the butadiene-1,3 having a pH above 9 and containing 3 to 10 parts per 100 parts of rubber of the latex of alkali-metal soap of soap-forming monocarboxylic acid having 10 to 20 carbon atoms per molecule and containing ammonium chloride in amount to react with $2/10$ to $7/10$ of said alkali-metal soap on removal of the ammonia, distilling the ammonia of the ammonium chloride from the latex, whereby enough hydrochloric acid is liberated to react with said $2/10$ to $7/10$ of the soap present to form alkali-metal chloride and free soap-forming monocarboxylic acid and reduces the pH of the latex without coagulating the latex, heating the thus treated latex for at least one hour at a temperature from 40° C. to 100° C. to increase the particle size of the latex and thereafter adding alkali to the latex to raise the pH of the latex at least one unit and to assure a pH above 9 to increase the stability of the same.

11. The method which comprises preparing an alkaline synthetic rubber latex emulsion polymerizate of a mixture of butadiene-1,3 and styrene containing at least 50% by weight of the butadiene-1,3 having a pH above 9 and containing 3 to 10 parts per 100 parts of rubber of the latex of alkali-metal soap of soap-forming monocarboxylic acid having 10 to 20 carbon atoms per molecule, and containing ammonium chloride in amount to react with $2/10$ to $7/10$ of said alkali-metal soap on removal of the ammonia, distilling the ammonia of the ammonium chloride from the latex whereby enough hydrochloric acid is liberated to react with said $2/10$ to $7/10$ of the soap present to form alkali-metal chloride and free soap-forming monocarboxylic acid and reduces the pH of the latex without coagulating the latex, heat concentrating the latex at a temperature from 40° C. to 100° C. until the solids concentration of the latex has increased at least 5% whereby the particle size of the latex is increased, and thereafter adding alkali to the latex to raise the pH of the latex at least one unit and to assure a pH above 9 to increase the stability of the same.

12. The method which comprises preparing an alkaline synthetic rubber latex emulsion polymerizate of a mixture of butadiene-1,3 and styrene containing at least 50% by weight of the butadiene-1,3 having a pH above 9 and containing 3 to 10 parts per 100 parts of rubber of the latex of alkali-metal soap of soap-forming monocarboxylic acid having 10 to 20 carbon atoms per molecule, and ammonium chloride in amount to react with $2/10$ to $7/10$ of said alkali-metal soap on removal of the ammonia, distilling the ammonia of the ammonium chloride from the latex whereby enough hydrochloric acid is liberated to react with said $2/10$ to $7/10$ of the soap present to form alkali-metal chloride and free soap-forming monocarboxylic acid and reduces the pH of the latex without coagulating the latex, heating the thus treated latex at 40° C. to 100° C. until the optical density per gram of rubber per liter of water is increased at least 25% as measured in a spectrophotometer using a wave length of 7000 Angstrom units, and thereafter adding alkali to the latex to raise the pH of the latex at least one unit and to assure a pH above 9 to increase the stability of the same.

References Cited in the file of this patent

UNITED STATES PATENTS

| | | |
|---|---|---|
| 2,444,689 | Willson | July 6, 1948 |
| 2,444,801 | Arundale | July 6, 1948 |
| 2,446,115 | Svendsen | July 27, 1948 |